United States Patent
Jiang et al.

(10) Patent No.: US 6,859,622 B1
(45) Date of Patent: Feb. 22, 2005

(54) PREDICTIVE OPTIMIZATION OF WAVELENGTH DIVISION MULTIPLEXED SYSTEMS

(75) Inventors: Yuan Jiang, Eatontown, NJ (US); Saeid Seynejad, Ottawa (CA); James Harley, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 581 days.

(21) Appl. No.: 09/746,187

(22) Filed: Dec. 26, 2000

(51) Int. Cl.$^7$ .................. H04B 10/08; H04B 10/04; H04J 14/02

(52) U.S. Cl. ............... 398/25; 398/94; 398/197; 398/193

(58) Field of Search ............... 398/30, 34, 38, 398/79–97, 197, 140–148, 25, 28, 29, 31, 32, 33, 81, 94, 194, 193; 359/124; 372/29.01–33

(56) References Cited

U.S. PATENT DOCUMENTS

| | | | |
|---|---|---|---|
| 5,060,302 A | * 10/1991 | Grimes | 398/197 |
| 5,202,782 A | * 4/1993 | Nakamura et al. | 398/91 |
| 5,212,578 A | * 5/1993 | Grimes et al. | 398/7 |
| 5,225,922 A | 7/1993 | Chraplyvy et al. | 359/124 |
| 5,673,129 A | * 9/1997 | Mizrahi | 398/95 |
| 5,790,289 A | * 8/1998 | Taga et al. | 398/79 |
| 5,847,862 A | 12/1998 | Chraplyvy et al. | 359/337 |
| 5,894,362 A | * 4/1999 | Onaka et al. | 398/95 |
| 5,943,151 A | * 8/1999 | Grasso et al. | 398/147 |
| 6,040,933 A | 3/2000 | Khaleghi et al. | 359/124 |
| 6,072,614 A | * 6/2000 | Roberts | 398/177 |
| 6,134,034 A | * 10/2000 | Terahara | 398/1 |
| 6,252,692 B1 | * 6/2001 | Roberts | 398/147 |
| 6,392,769 B1 | * 5/2002 | Ford et al. | 398/9 |
| 6,396,586 B1 | * 5/2002 | Wei et al. | 356/479 |
| 6,452,716 B1 | * 9/2002 | Park et al. | 359/334 |

OTHER PUBLICATIONS

"Impulse pump depletion in saturated Raman Amplifiers," Bononi A, Papararo M, Vannucci A, IEEE Electronics Letters, vol. 37, Issue 14, Jul. 5, 2001, p. 886–887.*

"Impact of stiumlated Raman scattering on the transmission performance of WDM systems," Tsuda, S.; Lucero, A.J.; Mazzali, C.; da Silva, V.L.; SBMO/IEEE MTT–S, APS and LEOS—IMOC '99. International, vol. 2, Aug. 9–12, 1999, p. 359–361.*

Optical SNR degradation due to stimulated Raman scattering in dual–band WDM transmission systems and its compensation by optical level management, Hoshida, T.; Terahara, T.; Kumasako, J.; Onaka, H.; Comm, 1999. APCC/OECC '99. vol. 1, Oct. 18–22, 1999, p. 342–5.*

"Nonlienar Fiber Optcs,"G. Agrawal, Third Edition, Academic Press 1995, p. 329–397.*

(List continued on next page.)

*Primary Examiner*—Leslie Pascal
*Assistant Examiner*—Dalzid Singh (57) ABSTRACT

The performance of a WDM system is improved by adjusting launch powers of each channel responsive to a prediction of system performance degradation. The prediction of system performance degradation could relate to the effect of Stimulated Raman Scattering (SRS) in which case, given launch power, a value representative of the effect of SRS is estimated for each channel in a WDM system using a method described herein. Using this SRS effect estimate, a value is computed for the estimated output power of each channel. These estimated output power values are then used to refine the estimate of the SRS effect on each channel. Subsequently, the refined SRS effect estimates are used to refine the estimated output power values. These steps are repeated and eventually an estimate of SRS effect on each wavelength channel is settled upon that is as accurate as that which results from other, more computationally complex, methods.

14 Claims, 5 Drawing Sheets

OTHER PUBLICATIONS

Christodoulides, D.N. et al., "Evolution of Stimulated Raman Crosstalk in Wavelength Division Multiplexed Systems", IEEE Photonics Technology Letters, vol. 8, No. 12, Dec. 1996, pp 1722–1724.

Tariq, S. et al., "A Computer Model of Non–Dispersion–Limited Stimulated Raman Scattering in Optical Fiber Multiple–Channel Communications", Journal of Lightwave Technology, vol. 11, No. 12, Dec. 1993, pp 1914–1924.

* cited by examiner

PREDICTIVE OPTIMIZATION OF WAVELENGTH DIVISION MULTIPLEXED SYSTEMS

FIELD OF THE INVENTION

The present invention relates to communication over optical fibers and, more particularly, to predictive optimization of wavelength division multiplexed systems.

BACKGROUND OF THE INVENTION

Optical networks, which use optical fiber as a transmission medium, are well known for use in transmission of digital data signals. To make efficient use of a single optical fiber, many unique data signals may be transmitted over the same fiber so long as each data signal modulates an optical signal with a wavelength different from the other optical signals on the same fiber. This transmission scheme is called Wavelength Division Multiplexing (WDM). When the wavelengths of the different optical signals are only marginally different from one another, the transmission scheme may be called Dense Wavelength Division Multiplexing (DWDM). In a network using DWDM, two elements connected by a single physical link (optical fiber) may communicate using a number of signal channels, where each signal channel is an optical signal with a distinct wavelength. However, each signal channel may not be independent of the other signal channels transmitted on the same fiber, even though the other signal channels are transmitted at different wavelengths. An effect called Stimulated Raman Scattering (SRS) may allow crosstalk from one or more signal channels to cause changes (amplification or attenuation) to occur in a signal channel of interest.

SRS is an important non-linear effect in optical fibers named for the scientist who discovered a phenomenon in the scattering of light, called the Raman Effect, in 1928. Raman scattering occurs in a silica fiber when light propagates through the fiber. Stimulated Raman Scattering is an inelastic scattering process in which an incident photon loses its energy to create another photon of reduced energy at a lower frequency. That is, energy of a first signal at one wavelength may effect a second signal at a longer wavelength. SRS is often portrayed as a plot of Raman gain, $g_R$, as a function of frequency (or wavelength). In such a plot, the magnitude of the Raman gain may be shown to vary over a Raman bandwidth (i.e., the bandwidth over which $g_R$ is non-zero).

As WDM systems move towards densely packed wavelengths in DWDM and related high channel count, SRS becomes a critical factor in system performance. Accordingly, modeling SRS accurately has been a research topic recently.

It has been shown that a WDM system is optimized when all channels have equal power or, alternatively, Optical Signal to Noise Ratio (OSNR) at the output of the fiber. Several schemes have been proposed for equalizing channel output power. In one scheme, disclosed by Chraplyvy in U.S. Pat. No. 5,225,922, issued Jul. 6, 1993, the output power of each channel is measured at the receiver. Based on these measurements, adjustments are made to the optical input signal power for each channel. In another scheme, disclosed by Khaleghi, et al, in U.S. Pat. No. 6,040,933, issued Mar. 21, 2000, optical power measurements of each channel are taken at inputs of optical amplifiers along the transmission path of the system. The channels are equalized by adjusting the optical input signal powers of each channel based on the measurements. In each of these schemes, there is a requirement for accurate power measurement and a feedback path over which instructions may be received for making adjustments based on the measurements. However, neither scheme may be used in the absence of a feedback path. Further, accurate optical power measurement generally involves expensive hardware. It would be desirable, then, to optimize a WDM system by equalizing output power for each channel in the system even in the absence of a feedback path.

SUMMARY OF THE INVENTION

A prediction of system performance degradation is determined. Based on this prediction, output power for each channel in a WDM system is estimated and, based on the estimated output power, the launch power of each channel may be adjusted. The prediction of system performance degradation could relate to the effect of Stimulated Raman Scattering (SRS) in which case, given launch power, a value representative of the effect of SRS is estimated for each channel in a WDM system using a method described herein. Using this SRS effect estimate, an intermediate value is computed for the output power of each channel. These intermediate output power values are then used to refine the estimate of the SRS effect on each channel. Subsequently, the refined SRS effect estimates are used to refine the intermediate power values. These steps are repeated and eventually an estimate of SRS effect on each channel is settled upon that is within engineering tolerance of that which results from other, more computationally complex, methods. This estimate of SRS effect on each channel may then be used to optimize the WDM system.

Advantageously, the method quantifies SRS accurately yet involves low computational complexity and is especially well suited to practical implementation.

In accordance with an aspect of the present invention there is provided a method for improving the performance of a wavelength division multiplexed system, the wavelength division multiplexed system including a plurality of wavelength channels. The method includes determining a prediction of system performance degradation, based on the prediction, determining an estimated output power for each wavelength channel of the plurality of wavelength channels and, based on the estimated output power, generating a control signal, the control signal for adjusting a launch power for each wavelength channel. In another aspect of the invention a system control unit is provided for performing this method. In a further aspect of the present invention, there is provided a software medium that permits a general purpose computer to carry out this method.

In accordance with another aspect of the present invention there is provided an optical transmission system including a plurality of channel transmitters, each for generating a corresponding wavelength channel, a multiplexer for combining the wavelength channels into a wavelength multiplexed signal sent on an optical fiber and a system control unit for: determining a prediction of system performance degradation; based on the prediction, determining an estimated output power for each wavelength channel at an output of the optical fiber; and, based on the estimated output power, generating a control signal, the control signal for transmitting to the channel transmitter for adjusting a launch power for each wavelength channel.

In accordance with a further aspect of the present invention there is provided a method for estimating an effect of Stimulated Raman Scattering (SRS) in a wavelength division multiplexed system. The method includes determining an estimate of the effect of SRS on each wavelength channel in the wavelength division multiplexed system based on an indication of launch power, determining a plurality of estimated output power values, one of the plurality of estimated output power values corresponding to each wavelength channel, based on the estimate of the effect of SRS on each wavelength channel and improving the estimate of the effect of SRS on each wavelength channel based on the plurality of estimated output power values to result in a plurality of improved SRS estimates. In another aspect of the invention a system control unit is provided for performing this method. In a further aspect of the present invention, there is provided a software medium that permits a general purpose computer to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION OF THE PREFERRED EMBODIMENTS

Figure 1:
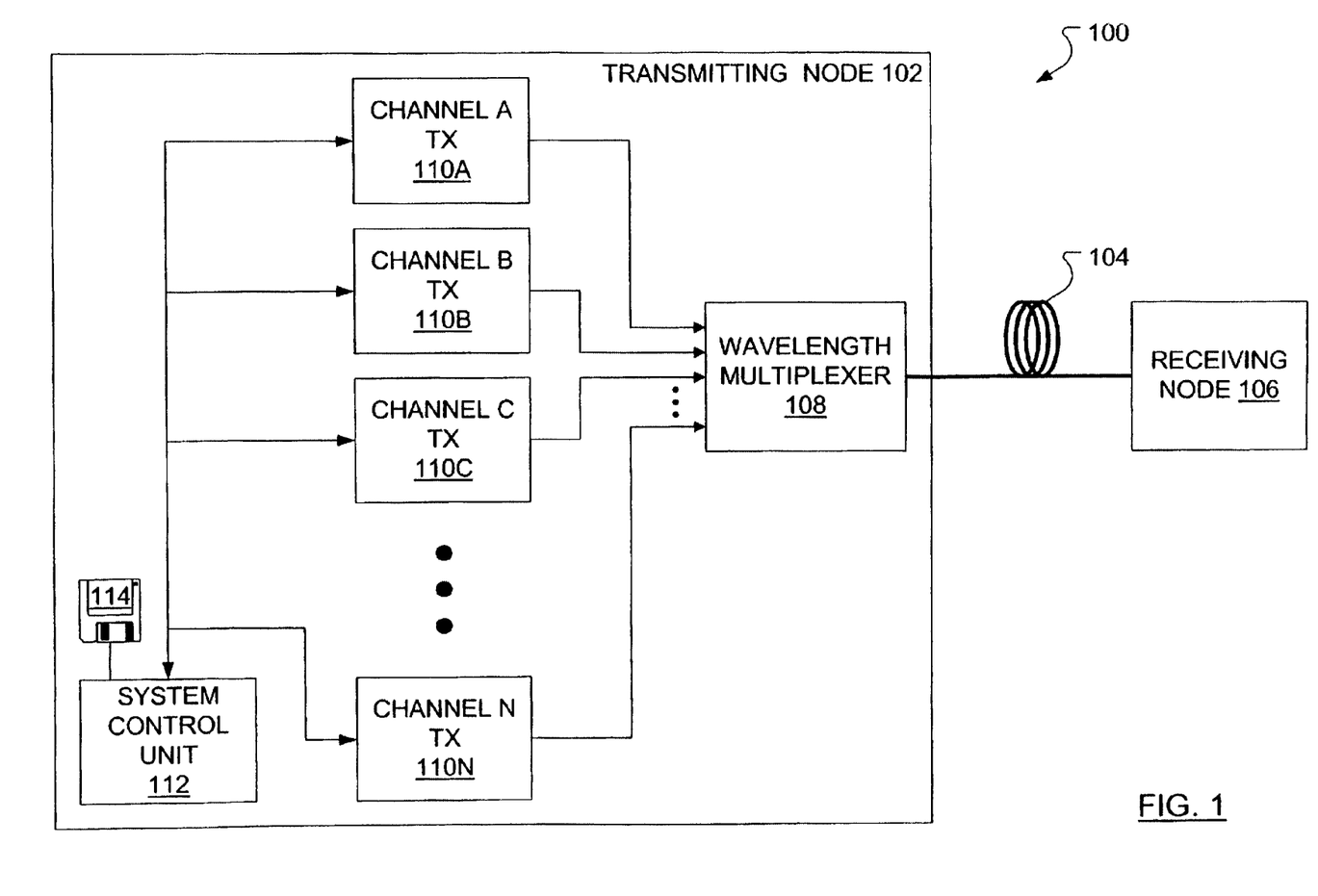
FIG. 1 schematically illustrates a DWDM system.

In FIG. 1, a DWDM system 100 includes a transmitting node 102, an optical fiber 104 and a receiving node 106. The transmitting node 102 further includes N channel transmitters 110A, 110B, 110C, ..., 110N (generally referred to as a channel transmitter 110) that each provide a wavelength channel to a multiplexer 108. The multiplexer 108 multiplexes the channels received from the channel transmitters 110 and sends the multiplexed signal to the receiving node 106 over the fiber 104. A launch power given to each channel by each channel transmitter 110 is controlled by a system control unit 112. As such, each channel transmitter 110 may include a laser source and an attenuator/amplifier (not shown) to adjust the launch power for the respective channel. The system control unit 112 may be loaded with transmitter control software for executing methods exemplary of this invention from software medium 114 which could be a disk, a tape, a chip or a random access memory containing a file downloaded from a remote source.

Figure 2:
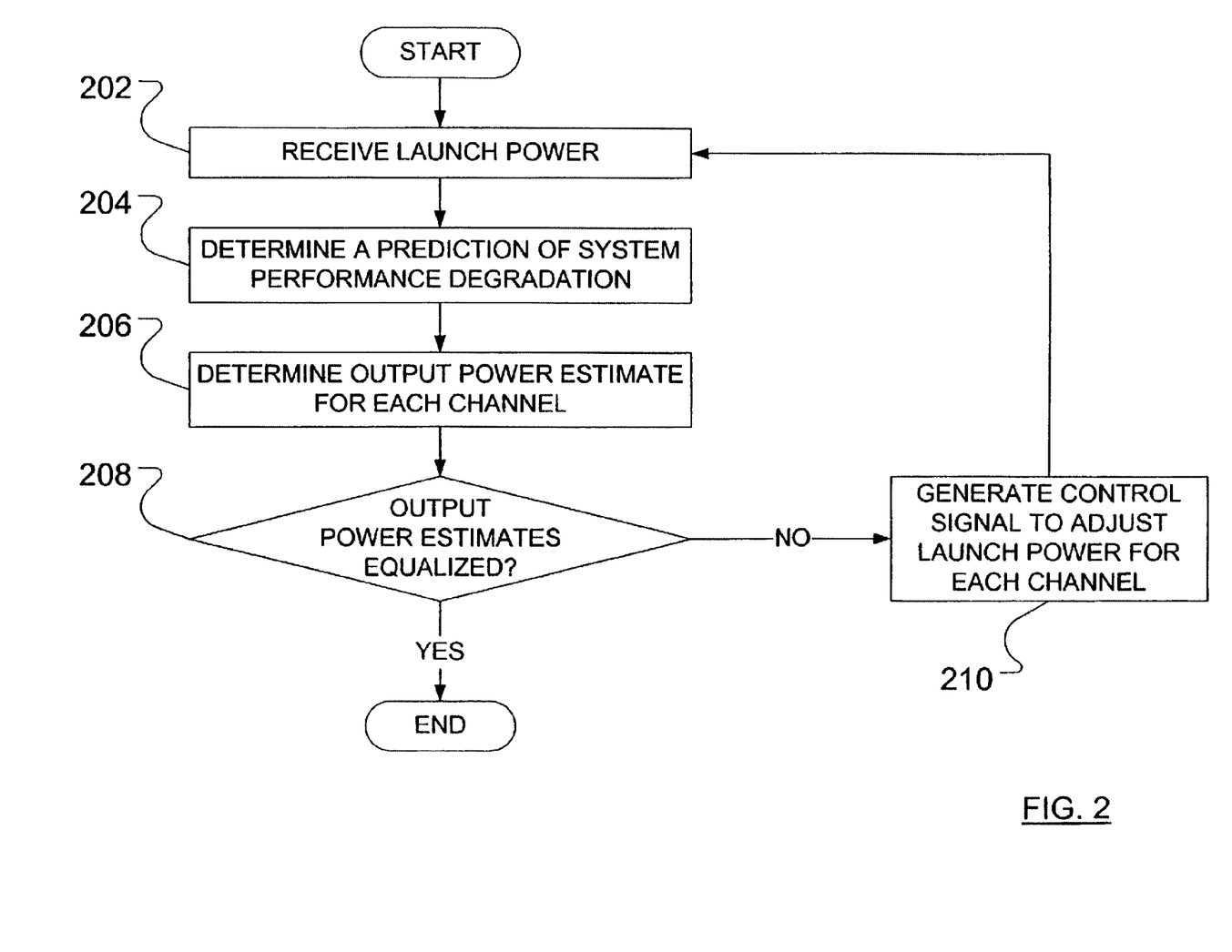
FIG. 2 illustrates steps of a WDM system performance improving method in accordance with an embodiment of the present invention.

In overview, operation of the system control unit 112 may be considered in view of FIG. 2. Initially, a launch power indication is received from each channel transmitter 110 (step 202). Based on the launch power, a prediction of performance degradation of each channel in the DWDM system 100 is determined (step 204). Based on this prediction, output power for each channel is estimated (step 206). It is then determined whether the estimated output power for each channel is substantially the same (step 208). If not, the launch power of each channel is adjusted (step 210) and the adjusted launch powers are provided to the system control unit 112 (step 202). The method is complete when the estimated output power for each channel, as determined in step 208, is substantially the same. This adjustment serves to optimize the DWDM system 100.

In particular, the prediction of system performance degradation could relate to the effect of Stimulated Raman Scattering (SRS). There is, then, a requirement for a method to be used in determining an estimated value representative of the effect of SRS for each channel in the WDM system. The SRS effect is determined using an equation called the coupled-equation. The coupled-equation may be expressed as $$\frac{dP_i(z)}{dz} = -\alpha_i P_i(z) + P_i(z) \sum_{j=1}^{i-1} g_{ij} \frac{P_j(z)}{K_{ij}A_{ij}} + P_i(z) \sum_{j=i+1}^{N} g_{ij} \frac{\lambda_j P_j(z)}{\lambda_i K_{ij}A_{ij}}, \quad (1)$$

where $P_i(z)$ is the power in the ith channel as a function of propagation distance, $z$, $\alpha_i$ is a fiber attenuation coefficient for the ith channel and is usually considered to be the same ($\alpha$) for all channels. $g_{ij}$ is a Raman gain coefficient between channel i and channel j that is calculated as $g_{ij}=g'(f_j-f_i)$, where $$g' = \frac{dg_R}{df}$$

and represents the slope of the Raman gain at frequency $f_i$. The Raman gain coefficient, $g_{ij}$, is usually considered to be the same for all channels. $A_{ij}$ is the effective cross sectional area of the fiber and is usually considered to be the same (i.e., $A_e$) for all channels. $1/K_{ij}$ is a polarization factor and is usually considered to be 0.5 for all channels. $\lambda_i/\lambda_j$ is a wavelength ratio between channel i and channel j and is usually considered to be unity for all channels.

Estimating the SRS effect using equation 1 is a mathematical challenge. A common approach to simplify the problem is to take the so-called "undepleted-pump" assumption (see Govind P. Agrawal, "Nonlinear Fiber Optics," Second Edition, Academic Press, 1995, hereby incorporated herein by reference) and solve the equation for two channels first and then extend the result to all channels. However, the result becomes unacceptably inaccurate as the channel count becomes high, as it does in DWDM systems. Recently, Christodoulides published a letter (Christodoulides, D. N. and Jander; R. B., "Evolution of Stimulated Raman Crosstalk in Wave-Length Division Multiplexed Systems," IEEE Photonics Technology Letters, 1996, hereby incorporated herein by reference) detailing a closed form solution to the coupled-equation (equation 1).

The Christodoulides method solves the coupled-equation (equation 1) directly to obtain an accurate yet complex closed-form solution for the maximum crosstalk impairment, XT, of a channel as a function of propagation distance, z, given equal channel loading, $$XT(z) = 1 - Ne^{-cNP_0 Z_e \frac{(N-1)}{2}} \left[ \frac{\sinh\left(\frac{cNP_0 Z_e}{2}\right)}{\sinh\left(\frac{cN^2 P_0 Z_e}{2}\right)} \right]. \quad (2)$$

In equation 2, N is the number of channels and $$c = \frac{g'\Delta f}{2A_e} \quad (3)$$

where $\Delta f$ is the interchannel frequency spacing, $A_e$, is the effective cross sectional area of the fiber and $Z_e$, is an effective propagation distance, given by $$Z_e = \frac{1 - e^{-\alpha z}}{\alpha}. \quad (4)$$

The result achieved using equation 2 is accurate, but very computationally intensive for practical implementation in embedded systems since it involves calculation of sinh, exponents, etc.

Figure 3:
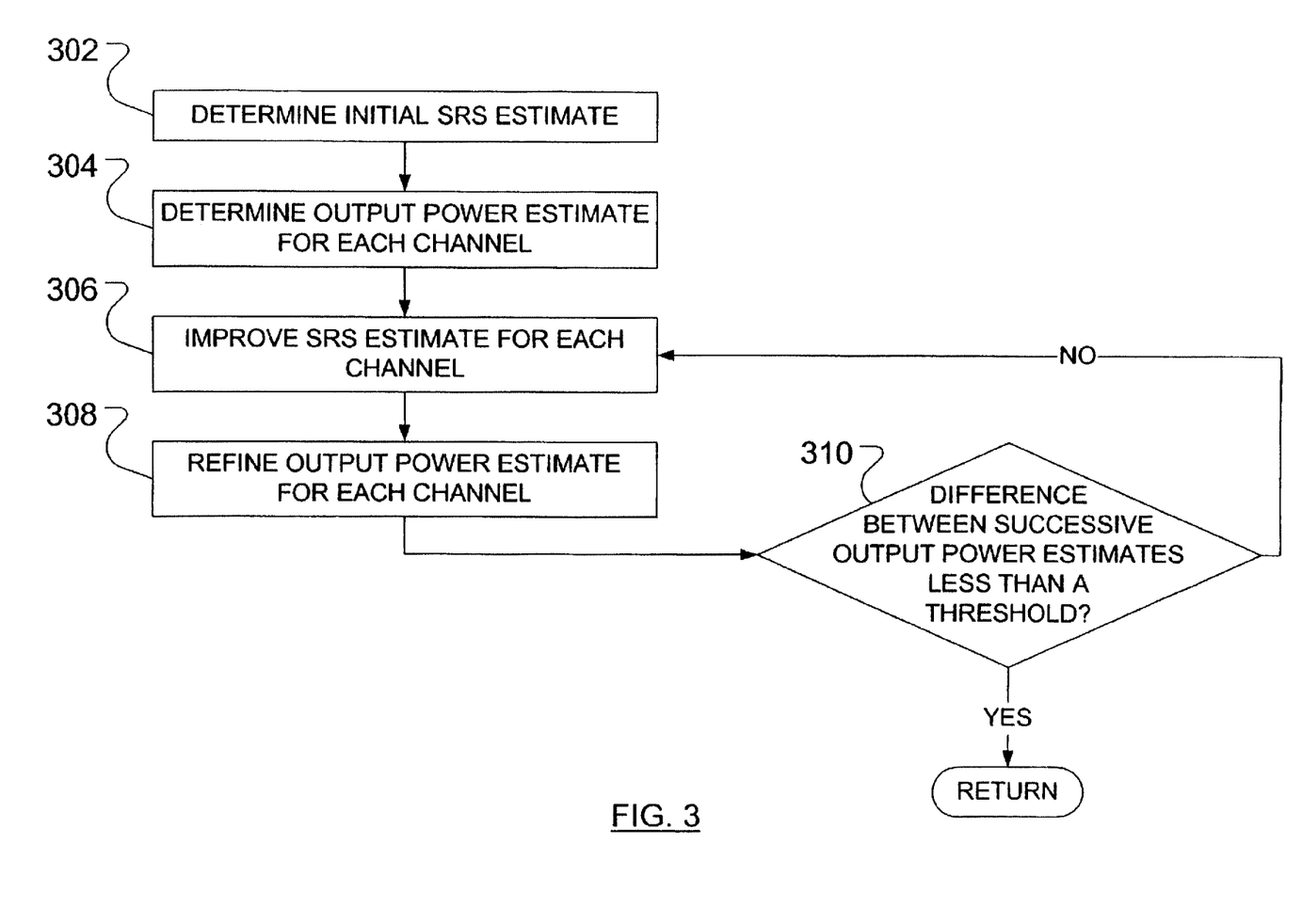
FIG. 3 illustrates steps of an SRS effect estimating method in accordance with an embodiment of the present invention.

According to the following iterative method, considered in view of FIG. 3, the undepleted pump assumption is used to solve the coupled-equation (equation 1) and the solution is iteratively modified. After a few iterations, the solution from the iterative method quickly approaches the solution from the Christodoulides method, yet with a significantly reduced computational complexity.

The DWDM system 100 (FIG. 1) is assumed to be an equally-spaced N-channel DWDM system. Furthermore, channel 1 has the lowest wavelength, channel N has the highest wavelength and the wavelengths of the channels increase monotonically with reference number. For a generic ith channel, there will be an increase in power as each channel with a shorter wavelength transfers power to the ith channel due to SRS. Similarly, the ith channel transfers power to those channels with longer wavelengths due to SRS.

The amount of power transfer (crosstalk), x, over the length of the fiber 104 due to SRS between any two channels may be computed (step 302) using the undepleted pump assumption as:

$$x^{[1]} = \frac{g_R}{2}\left(\frac{\Delta\lambda}{\Delta\lambda_R}\right)\left(\frac{L_e}{A_e}\right)P_0 \quad (5)$$

where $\Delta\lambda$ is wavelength spacing between the two channels, $\Delta\lambda_R$ is Raman bandwidth, $L_e$ is an effective length of the fiber 104 and $P_0$ represents launch power. By default, launch power is equal for each channel. The superscript [1] denotes the result is from the $1^{st}$ iteration. Notably, equation 5 is related to equation 3, in that $$\frac{g'\Delta f}{2A_e} = \frac{g_R}{2}\left(\frac{\Delta\lambda}{\Delta\lambda_R}\right)\left(\frac{L_e}{A_e}\right). \quad (6)$$

Equation 6 allows equation 5 to be simplified to $$x^{[1]} = cP_0. \quad (7)$$

The power at the output of the ith channel in the N-channel system 100, given SRS, may then be estimated as follows (step 304):

$$P_i^{[1]} = P_0 \sum_{k=1}^{N} [1 - (k-i)x^{[1]}] \quad (8)$$

For the second iteration, the power computed using equation 8, $P_i^{[1]}$, is substituted for $P_0$ in the right-hand side of equation 5 and a second iteration crosstalk estimate, $X_i^{[2]}$, is computed for each channel i (step 306), leading to an improved crosstalk estimate for each channel, $$x_i^{[2]} = \frac{g_R}{2}\left(\frac{\Delta\lambda}{\Delta\lambda_R}\right)\left(\frac{L_e}{A_e}\right)P_i^{[1]} \quad (9)$$

$$= cP_i^{[1]} \quad (10)$$

Using the improved (and channel specific) crosstalk estimate, the output power for channel i may be refined (step 308) to $$P_i^{[2]} = P_i^{[1]} \sum_{k=1}^{N} [1 - \delta(k-i)x_k^{[2]}], \quad (11)$$

where $\delta$ is a factor introduced to compensate for the fact that power transfer in each channel occurs over the length of the fiber. $\delta$ has an optimum range of between 0.575 and 0.625. A value of 0.6 has been used for $\delta$ with acceptable results.

Generally, then, for the mth iteration:

$$x_i^{[m]} = \frac{g_R}{2}\left(\frac{\Delta\lambda}{\Delta\lambda_R}\right)\left(\frac{L_e}{A_e}\right)P_i^{[m-1]} \quad (12)$$

$$= cP_i^{[m-1]} \quad \text{and} \quad (13)$$

$$P_i^{[m]} = P_i^{[m-1]} \sum_{k=1}^{N} [1 - \delta^{m-1}(k-i)x_k^{[m]}]. \quad (14)$$

After a few iterations of steps 306 and 308 (about 5 or 6), it has been found that the estimate of output power ($P_i$) for each channel is almost identical to the output power that may be obtained using the Christodoulides method. The number of iterations used in practice may be preset as a parameter of a system, based on a required degree of accuracy, or iterations may continue until the difference between successive iterations is suitably small, i.e., less than a threshold (step 310).

In operation, the control system 112 (FIG. 1) sends a control signal to adjust the launch power for each channel to the computed $P_i$.

Figure 4:
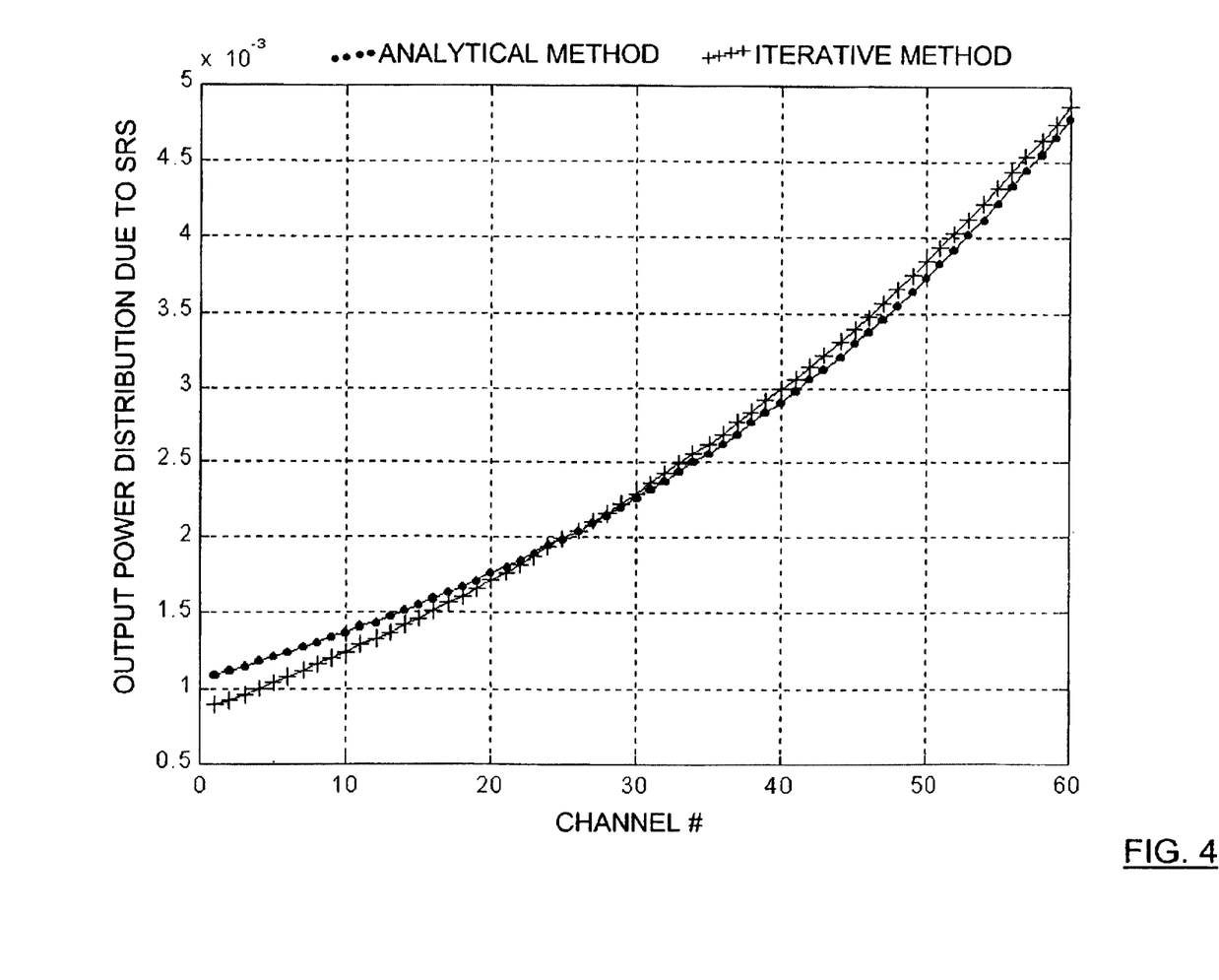
FIG. 4 is a plot comparing the iterative method of the present invention to an analytical method for 60 channels.
Figure 5:
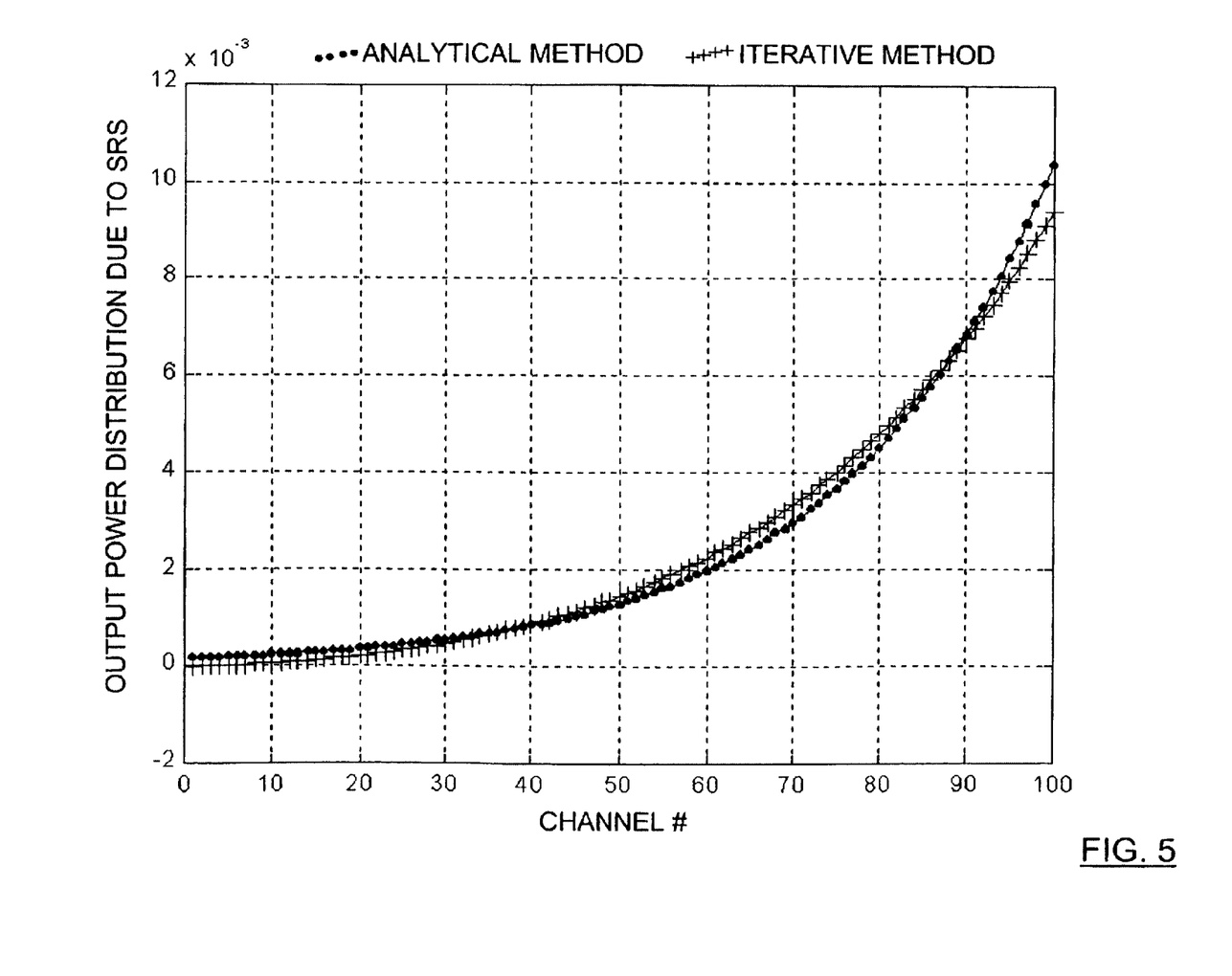
FIG. 5 is a plot comparing the iterative method of the present invention to an analytical method for 100 channels.

A comparison of this iterative method with the Christodoulides (analytical) method is illustrated in FIG. 4 for 60 channels and FIG. 5 for 100 channels.

Advantageously, the effect of SRS is quantified iteratively. Each iteration involves minimum amount of computation as the method uses addition and multiplication only (which are straightforward to implement). Further, c is a constant and can be computed off-line and computation-intensive operations (such as exponents, etc.), present in the Christodoulides method, have been avoided while obtaining good accuracy. This iterative method is particularly well suited to embedded systems.

Other modifications will be apparent to those skilled in the art and, therefore, the invention is defined in the claims.

We claim:

1. A method for improving the performance of a wavelength division multiplexed system, said wavelength division multiplexed system including a plurality of wavelength channels, said method comprising:
   iteratively determining a prediction of system performance degradation based, at least in part, on a launch power for each wavelength channel of said plurality of wavelength channels, an effective fiber length and an effective fiber cross sectional area;

based on said prediction, determining an estimated output power for said each wavelength channel of said plurality of wavelength channels; and based on said estimated output power, generating a control signal, said control signal for adjusting said launch power for said each wavelength channel.

2. The method of claim 1 wherein said adjusting acts to equalize said estimated output power for said each wavelength channel.

3. The method of claim 1 further comprising receiving an indication of said launch power for said each wavelength channel and basing said prediction of system performance degradation on said indication.

4. The method of claim 1 wherein said determining said estimated output power for each wavelenghth uses:

$$P_i^{[m]} = P_i^{[m-1]} \sum_{k=1}^{N} \left[ 1 - \delta^{m-1}(k-i) \frac{g_R}{2} \left(\frac{\Delta\lambda}{\Delta\lambda_R}\right)\left(\frac{L_e}{A_e}\right) P_k^{[m-1]} \right]$$

where:

$P_i^{[m]}$ is the power in ith channel after an mth iteration;

$\delta$ is a compensating factor;

$g_R$ is Raman gain;

$\Delta\lambda$ is wavelength spacing;

$\Delta\lambda_R$ is Raman bandwidth;

$L_e$ is said effective fiber length; and $A_e$ is said effective fiber cross sectional area.

5. The method of claim 4 wherein said performance degradation occurs due to Stimulated Roman Scattering (SRS) and said determining said prediction comprises determining an effect, x, of SRS on said each wavelength channel where $$x = \frac{g_R}{2}\left(\frac{\Delta\lambda}{\Delta\lambda_R}\right)\left(\frac{L_e}{A_e}\right) P_0$$

and $P_0$ is said launch power.

6. A method for improving the performance of a wavelength division multiplexed system, said wavelength division multiplexed system including a plurality of wavelength channels, said method comprising:

receiving an indication of an initial launch power for each wavelength channel of said plurality of wavelength channels;

based on said indication of said initial launch power, determining a prediction of system performance degradation, wherein said performance degradation occurs due to Stimulated Raman Scattering (SRS) and said determining said prediction comprises includes determining an effect of SRS on said each wavelength channel;

said determining said effect of SRS including:
    determining an estimate of said effect of SRS on said each wavelength channel based on said indication of said initial launch power;
    based on said estimate of said effect of SRS on said each wavelength channel, determining a plurality of estimated output power values, one of said plurality of estimated output power values corresponding to said each wavelength channel; and
    improving said estimate of said effect of SRS on said each wavelength channel based on said plurality of estimated output power values to result in a plurality of improved SRS estimates;

based on said plurality of improved SRS estimates, determining a plurality of refined estimated output power values; and based on said plurality of refined estimated output power values, generating a control signal for said each wavelength channel, said control signal for adjusting said initial launch power for said each wavelength channel to result in an adjusted launch power.

7. The method of claim 6 further comprising further improving said plurality of improved SRS estimates based on said plurality of refined estimated output power values to result in a plurality of further improved SRS estimates.

8. The method of claim 7 further comprising further refining said plurality of refined estimated output power values based on said plurality of further improved SRS estimates to result in a plurality of further refined estimated output power values.

9. The method of claim 8 further comprising repeating said further improving and said further refining.

10. The method of claim 9 further comprising performing said repeating until a difference between successive refined estimated output power values corresponding to a given wavelength channel is less than a threshold.

11. The method of claim 4 where said determining said effect of SRS further comprises using the undepleted pump assumption.

12. An optical transmission system comprising:
    a plurality of channel transmitters, each for generating a corresponding wavelength channel;
    a multiplexer for combining said wavelength channels into a wavelength multiplexed signal sent on an optical fiber;
    a system control unit for:
        iteratively determining a prediction of system performance degradation based, at least in part, on a launch power for each wavelength channel of said plurality of wavelength channels, an effective fiber length and an effective fiber cross sectional area;
        based on said prediction, determining an estimated output power for said each wavelength channel at an output of said optical fiber; and
        based on said estimated output power, generating a control signal, said control signal for transmitting to said channel transmitter for adjusting said launch power for said each wavelength channel.

13. A system control unit in a wavelength division multiplexed system operable to:
    iteratively determine a prediction of system performance degradation based, at least in part, on a launch power for each wavelength channel of said plurality of wavelength channels, an effective fiber length and an effective fiber cross sectional area;
    based on said prediction, determine an estimated output power for said each wavelength channel of a plurality of wavelength channels in said wavelength division multiplexed system; and
    based on said estimated output power, generate a control signal, said control signal for adjusting said launch power for said each wavelength channel.

14. A computer readable medium containing computer-executable instructions which, when performed by a processor in a system control unit in a wavelength division multiplexed system, cause the processor to:
    determine a prediction of system performance degradation;

based on said prediction, determine an estimated output power for each wavelength channel of a plurality of wavelength channels in said wavelength division multiplexed system;

improve said prediction of system performance degradation based on said estimated output power for said each wavelength channel to result in an improved prediction of system performance degradation;

determine a revised estimated output power for said each wavelength channel based on said improved prediction of system performance degradation; and based on said revised estimated output power, generate a control signal, said control signal for adjusting a launch power for said each wavelength channel.

* * * * *

UNITED STATES PATENT AND TRADEMARK OFFICE
CERTIFICATE OF CORRECTION

PATENT NO.    : 6,859,622 B1  Page 1 of 1
DATED         : February 22, 2005
INVENTOR(S)   : Jiang et al.

It is certified that error appears in the above-identified patent and that said Letters Patent is hereby corrected as shown below:

Title page,
Item [56], References Cited, OTHER PUBLICATIONS, insert:
-- Zirngibl, M. "Analytical Model of Raman Gain Effects in Massive Wavelength Division Multiplexed Transmission System", Electronic Letters, Vol. 34, No. 8, April 16, 1998, pp.789-790 --.

Column 7,
Line 24, replace "power in ith channel" with -- power in an ith channel --.
Line 33, replace "Stimulated Roman Scattering" with -- Stimulated Raman Scattering --.

Signed and Sealed this

Twenty-eighth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,859,622 B1 Page 1 of 1
APPLICATION NO. : 09/746187
DATED : February 22, 2005
INVENTOR(S) : Jiang et al.

It is certified that error appears in the above-identified patent and that said Letters Patent is hereby corrected as shown below:

In the listing of Inventor, replace "Saeid Seynejad" with --Saeid Seydnejad--

Signed and Sealed this

Nineteenth Day of December, 2006

JON W. DUDAS
*Director of the United States Patent and Trademark Office*